Figure 1:
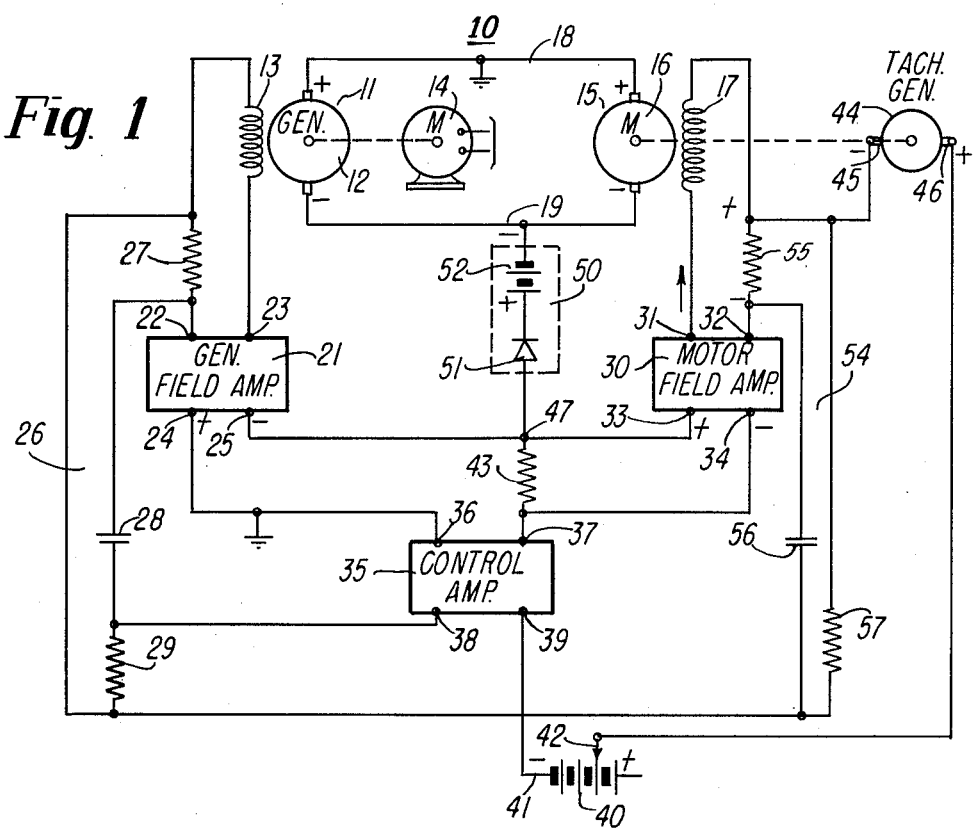

Feb. 20, 1962        B. M. JONES        3,022,453
DIRECT CURRENT SPEED DRIVE SYSTEM
Filed March 30, 1959

INVENTOR.
Byron M. Jones.
BY
Attys.

United States Patent Office 3,022,453
Patented Feb. 20, 1962

3,022,453
DIRECT CURRENT SPEED DRIVE SYSTEM
Byron M. Jones, Milwaukee, Wis., assignor to The Louis Allis Co., Milwaukee, Wis., a corporation of Wisconsin
Filed Mar. 30, 1959, Ser. No. 802,992
12 Claims. (Cl. 318—154)

The present invention relates to a direct current adjustable speed drive system and particularly to a control circuit for accurately controlling the speed of the motor throughout its entire speed range.

It is well known that the speed of a D.C. motor can be controlled by means of either the motor field current or the motor armature voltage. In many applications, both the armature voltage and the field current of the motor are controlled so that below a base speed, the field current is held constant and the armature voltage alone is varied and above the base speed the armature voltage is held constant and the field current alone is varied. This type of control takes advantage of the known characteristic that for a fixed field energization, an increase in the armature voltage will cause a corresponding increase in motor speed and that for a given armature voltage energization, a decrease in field current will cause a corresponding increase in motor speed. The point in motor speed control where the conversion takes place between armature voltage control and field current control is commonly referred to as the cross-over point and the speed at that point is generally recognized as being the base speed of the motor. This type of control is generally troublesome in that the cross-over point is not always easily defined and varies because of the difficulty in achieving stabilization of the drive over the entire speed range of the motor without at the same time sacrificing drive performance.

It is a general object of the present invention to provide an improved direct current drive system that avoids the above listed disadvantages.

It is a further object of the present invention to provide a new and improved direct current motor speed control system for accurately regulating the motor to any speed in its entire speed range.

A further object of the invention is to provide a motor control circuit for a motor-generator arrangement wherein the speed of the motor is controlled entirely in accordance with the energization provided to the generator field winding and by the energization provided to the motor field winding.

A further object of the invention is to provide an improved control circuit for a motor-generator set wherein the generator field alone is controlled below the base speed of the motor and wherein the motor field alone is controlled at speeds above the base speed of the motor.

A more specific object of the invention is to provide a control circuit for a motor generator set of the Ward-Leonard type wherein the generator field winding and the motor field winding are energized from respectively corresponding amplifiers each of a high impedance input type and connected in a loop circuit with a source of power for the amplifiers and with a low impedance shunt for the input to one amplifier. A normally blocked bleed circuit is provided between the power loop for the amplifiers and the armatures of the motor generator set so that at armature voltages below a predetermined voltage corresponding to the motor base speed, changes in power to the amplifiers are effective in only one of the amplifiers and at armature voltages above the predetermined voltage, changes of power to the amplifiers are effective in the other one of the amplifiers. Further, regulation of the motor speed is achieved through use of a feedback circuit providing a bucking voltage to the power source proportional to the speed of the motor, and hunting operations of the motor and its regulation is controlled through use of a differentiating circuit which provides a bucking voltage to the source of power in accordance with changes in the rate of energization of the speed controlling field winding.

Further objects of the invention pertain to the particular arrangements and structures whereby the above-identified and other objects of the invention are achieved.

Figure 2:
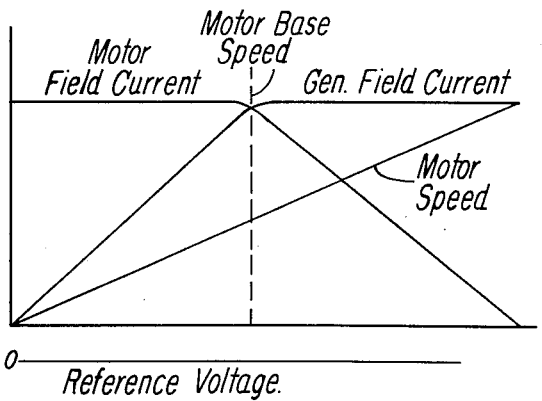

The invention, both as to its structure and method of operation will be better understood by reference to the following specification and drawings, forming a part thereof wherein:

FIGURE 1 is a schematic circuit diagram of a direct current motor control system in accordance with the invention; and FIGURE 2 is a graph illustrating the operating characteristics of the system set forth in FIGURE 1.

Referring specifically to the drawings, FIGURE 1 shows the complete system including a Ward-Leonard type motor generator set 10 and a control circuit therefor 20. The motor generator set includes a generator 11, provided with an armature 12 and a field winding 13, a generator exciter 14, mechanically linked to the armature 12 of the generator 11, a motor 15, including an armature 16, and a field winding 17. The armature 12 of the generator and the armature 16 of the motor are according to conventional practice coupled at the brushes thereof by conductors 18 and 19.

The control circuit 20 includes a generator field amplifier 21, a motor field amplifier 30, a control amplifier 35, a shunt resistor 43, a reference voltage source 40, a motor speed voltage source 44, a negative feedback loop 26, a negative feedback loop 54 and a current blocking connection 50.

The generator field amplifier 21 is provided with a pair of output terminals 22 and 23 which are connected in a loop circuit with a load resistor 27 and the field winding 13 of the generator 11 in order to provide an exciting current $I_g$ for the generator field. The pair of input terminals 24 and 25 are connected to the control amplifier 35 in a manner as described hereinafter. The motor field amplifier 30 is provided with a pair of output terminals 31 and 32 which are connected in a series loop with the load resistor 55 and the field winding 17 of the motor 15 for providing thereto an exciting current $I_m$. Control to the motor field amplifier 30 is provided at the input terminals 33 and 34 as described hereinafter.

The control amplifier 35 is of the direct current type and includes a pair of output terminals 36 and 37 which are connected in a series loop with the input terminals of the field amplifiers 21 and 30. Specifically, the output terminal 36 of the control amplifier 35 is joined to the control terminal 24 of the generator field amplifier, the control terminal 25 of the amplifier 21 is joined directly to the control terminal 33 of the motor field amplifier 30, and the control terminal 34 of the amplifier 30 is connected directly to the output terminal 37 of the control amplifier 35. A low impedance shunt resistor 43 is connected across the control terminals 33 and 34 of the motor field amplifier 30.

The load resistor 27 positioned in the generator field winding loop serves as a tap-off point for the negative feedback circuit 26 including a capacitor 28 and a resistor 29 connected in series across the terminals thereof. This arrangement operates as a differentiating circuit with the output voltage across the terminals of the resistor 29 corresponding to the rate of change of current flow through the resistor 27. The resistor 55 in the motor field winding loop performs the same function serving as a tap-off point for the negative feedback circuit 54 including a capacitor 56 and the resistor 57 connected in series across the terminals of the resistor 55. The voltage drop across the terminals of the resistor 57 corresponds to the rate of change in current flow through the resistor 55.

The reference voltage source 40, here shown to be a battery, includes a fixed terminal 41 and a variable terminal 42, thereby permitting the selection of an appropriate reference voltage. The motor speed voltage source 44, here indicated by way of example to be a tachometer generator coupled directly to the armature 16 of the motor 15, provides across its brushes 45 and 46 a voltage directly proportional to the rotational speed of the motor armature 16.

As shown in FIGURE 1, the reference voltage source 40 is assumed to have a particular polarity arrangement with the variable terminal 42 being positive relative to terminal 41. By the same token, the brushes 45 and 46 of the tachometer generator will, in normal operation of the system, assume a voltage polarity, here the brush 45 being assumed to be negative relative to the brush 46. In the connection, the tachometer generator 44, the feedback resistor 29 and the feedback resistor 57 are connected in a series aiding relationship with one another and in a series opposition relationship with the voltage reference source 40 across the terminals 38 and 39 of the control amplifier 35. Thus in this arrangement, the selected output voltage of the source 40 establishes the fundamental operating condition for the circuit and the output voltages of the tachometer generator, the load resistor 29 and the load resistor 57 provide bucking voltages thereto which serve to stabilize the operation of the system.

The current blocking connection 50 includes a unidirectional conducting device 51 and a bias source 52 connected in series from the junction 47 between the control terminal 25 of the amplifier 21, the control terminal 33 of the amplifier 30 and one end of the shunt resistor 43 to the armature conductor 19 of the motor-generator set 10.

For the reasons discussed hereinafter, the impedance of the shunt resistor 43 is selected to be relatively low as compared to the control input impedance of the field amplifiers 21 and 30. Additionally, the impedance values of the resistors 27, 29, 55 and 57 in the feedback circuits are selected to be of low values in order not to provide an undue load to the system.

Considering now the manner in which the circuit operates, and assuming a start condition wherein the motor speed is zero, the output of the reference voltage source 40 is zero volts, and the control amplifier 35 is operated so as to apply a negative voltage across its output terminals 36 and 37 thereof. By virtue of the shunt resistor 43 which is of a low impedance as compared to the impedance of the control terminals 24 and 25 of the field amplifier 21, substantially all of the output voltage from the control amplifier is effective across the terminals 24 and 25 of the generator field amplifier 21 and substantially no voltage is applied to the motor field amplifier 30. The generator field amplifier 21 and the motor field amplifier 30 are arranged so that under these circumstances, the generator field and accordingly, the exciting current $I_g$ is zero and the motor field and the associated exciter current $I_m$ are at a maximum. There is no armature voltage so that the diode 51 is back biased by the battery 52 and conduction therethrough is blocked. This condition is demonstrated by the graphical showing of FIGURE 2 at the position where the motor speed is zero.

Now assuming that the reference voltage source 40 is adjusted to provide a low output voltage, the output of the control amplifier 35 is controlled accordingly so as to decrease the negative output thereof and control the generator field amplifier 21 to produce a current flow $I_g$ thereby energizing the generator field winding 13, causing a generator armature voltage to be produced, and effecting rotation of the motor armature 16. As the output of the reference voltage source 40 increases, the generator field increases, the armature voltage increases and the motor speed increases. Accordingly, the output of the tachometer generator 10 will increase so as to provide a greater bucking voltage to the output of the reference voltage source 40 and thereby operating the control amplifier 35 and the generator field amplifier 21 in a manner tending to reduce the motor speed. Inasmuch as the output of the tachometer generator 44 is always less than that of the reference voltage source 40, its effect is to regulate motor speed.

As the reference voltage 40 is increased, the motor speed is increased to its base speed. The base speed is arbitrarily identified as speed control switches between the armature and field of the motor. In this example, when base speed is achieved, the armature voltage and voltage at junction 47 have changed sufficiently to provide a differential voltage for overcoming the back bias of the battery 52 and diode 51 in the blocking connection 50 so as to render the diode 51 conductive. With the diode 51 conductive, a low resistance circuit including the shunt resistor 43 is developed across the control terminals of the generator field amplifier 21 so that any further change in the output voltage of the control amplifier 35 appears across the resistor 43. The voltage developed across the shunt resistor 43 is to operate the motor field amplifier 30 so as to decrease the exciting current $I_m$ flowing to the motor field winding 17. With the generator field and the armature voltage held constant and at a maximum, decrease in the motor field causes an increase in speed. This effect is represented by the arrangement of FIGURE 2.

From the foregoing, it is clear that a motor speed can be established by selecting a particular output voltage for the reference source 40. Below the motor base speed only the generator field current and armature voltage changes and the motor field current is maintained constant, while above the motor base speed the motor field current changes and the generator field current and armature voltage stays constant. To prevent the motor speed from oscillating at any selected speed, the rate of change in field energizing currents are used for anti-hunting. Since the generator field current alone changes at low speeds below the base speed, this current is sensed in the loop circuit 26 including the resistor 27, the capacitor 28 and the resistor 29 to provide to the input of the control amplifier 35 damping signals in accordance with rate of change in the generator field exciting current $I_g$. Similarly, since the motor field current alone changes at high speeds above the base speed, this current $I_m$ is used for purposes of damping any oscillation in speed. Specifically, the loop circuit 54 including the resistor 55, the capacitor 56 and the resistor 57 provides to the input of the control amplifier 35 a damping signal corresponding to rate of change in the motor field energization current $I_m$ which tends to modify the output of the control amplifier to compensate for such changes. In this manner independently adjustable low speed and high speed anti-hunt signals are available. It is for this reason that transfer performance at low speeds is not sacrificed against stability at high speeds.

Though the arrangement described herein is at present considered to be preferred, it is understood that variations and modifications may be made therein without departing from the scope of the invention. Specifically, it is appreciated that arrangements other than tachometer generators can be employed for purposes of providing an output voltage proportional to motor speed and that arrangements different from that illustrated can be substituted for the blocking connection 50. It is intended to cover in the appended claims all such variations and modifications as fall within the true spirit and scope of the invention.

What is claimed is:

1. In a motor generator arrangement including a D.C. motor the speed of which is to be controlled in accordance with excitation provided by the armature and the field winding thereof and including a generator for controlling the motor armature voltage in accordance with the excitation provided to the generator armature by the generator field winding, the combination comprising, a first amplifier including a pair of output terminals connected to the field winding of the generator and including control terminals, a second amplifier including a pair of output terminals connected to the field winding of said motor and including control terminals, variable voltage output means connected in a series loop circuit with the control terminals of said first and second amplifiers for controlling the energization provided to the control terminals of said amplifiers, shunt means of a low impedance as compared to that of the control terminals of said first and second amplifiers connected across the control terminals of said second amplifier, and voltage responsive means between said loop circuit and said motor armature for completing a conductive path therebetween at potentials greater than a predetermined potential.

2. In a motor generator arrangement including a D.C. motor the speed of which is to be controlled in accordance with excitation provided by the armature and the field winding thereof and including a generator for controlling the motor armature voltage in accordance with the excitation provided to the generator armature by the generator field winding, the combination comprising, a first amplifier including a pair of output terminals connected to the field winding of the generator and including a pair of control terminals, a second amplifier including a pair of output terminals connected to the field winding of said motor, variable voltage output means connected in a series loop circuit with the control terminals of said first and second amplifiers for controlling the energization provided to said loop circuit, a shunt resistor across the control terminals of said second amplifier, said shunt resistor being of a low impedance as compared to the impedance of the control terminals of said first and second amplifiers, and a normally blocked current connection from said loop circuit at a point common to said first and second amplifiers to the armatures of the generator and motor, said normally blocked current connection being unblocked at potentials thereacross greater than a predetermined potential, so that at potentials less than said predetermined potential variations in the output of said variable output means are effective across the control terminals of said first amplifier for varying energization of the generator field winding and the armature voltage, and so that at potentials greater than said predetermined potential variation in the output of said variable output means is effective across the control terminals of said second amplifier for varying energization of the motor field winding.

3. In a motor generator arrangement including a D.C. motor the speed of which is to be controlled in accordance with excitation provided by the armature and the field winding thereof and including a generator for controlling the motor armature voltage in accordance with the excitation provided to the generator armature by the generator field winding, the combination comprising, a first amplifier including a pair of output terminals connected to the field winding of the generator and normally providing minimum energization thereto and including a pair of control terminals, a second amplifier including a pair of output terminals connected to the field winding of said motor and normally providing maximum energization thereto and including a pair of control terminals, variable voltage output means connected in a series loop circuit with the control terminals of said first and second amplifiers, a shunt resistor across the control terminals of said second amplifier, said shunt resistor being of a low impedance as compared to the impedance of the control terminals of said first and second amplifiers, and a normally blocked current connection from said loop circuit at a point common to said first and second amplifiers to the armatures of the generator and motor, said normally blocked current connection being unblocked at potentials thereacross greater than a predetermined potential, so that at potentials less than said predetermined potential variations in the output of said variable output means are effective at the control terminals of said first amplifier for varying the energization of the generator field winding between minimum and maximum energization and for varying said armature voltage from minimum to maximum, and so that at potentials greater than said predetermined potential variation in the output of said variable output means is effective at the control terminals of said second amplifier for varying energization of the motor field winding between maximum and minimum energization.

4. In a motor generator arrangement including a D.C. motor the speed of which is to be controlled in accordance with excitation provided by the armature and the field winding thereof and including a generator for controlling the motor armature voltage in accordance with the excitation provided to the generator armature by the generator field winding, the combination comprising, a first amplifier including a pair of output terminals connected to the field winding of the generator and normally providing minimum energization thereto and including a pair of control terminals, a second amplifier including a pair of output terminals connected to the field winding of said motor and normally providing maximum energization thereto and including a pair of control terminals, variable voltage output means connected in a series loop circuit with the control terminals of said first and second amplifiers, a shunt resistor across the control terminals of said second amplifier, said shunt resistor being of a low impedance as compared to the impedance of the control terminals of said first and second amplifiers, and a normally blocked current connection from said loop circuit at a point common to said first and second amplifiers to the armatures of the generator and motor, said normally blocked current connection being unblocked at potentials thereacross greater than a predetermined potential, so that variations in the output of said variable output means from a minimum up through a critical output causes a corresponding variation in the energization of said generator field winding from minimum to maximum energization and causes a corresponding variation in the motor armature voltage whereby motor speed is controlled between minimum and base speed, and so that variation in the output of said variable output means from said critical output to a maximum output causes an inverse variation in the energization of said motor field winding from maximum to minimum energization whereby motor speed is controlled between said base speed and maximum speed.

5. The motor speed control set forth in claim 4 wherein said variable voltage output means includes a source of variable reference voltage and a control amplifier connected at its input terminals to said voltage source and connected at its output terminals in the series loop with the control terminals of said first and second amplifiers.

6. In a motor generator arrangement including a D.C. motor the speed of which is to be controlled in accordance with excitation provided by the armature and the field winding thereof and including a generator for controlling the motor armature voltage in accordance with the excitation provided to the generator armature by the generator field winding, the combination comprising, a first power amplifier including a pair of output terminals connected to the field winding of the generator and normally providing minimum energization thereto and including a pair of control terminals, a second power amplifier including a pair of output terminals connected to the field winding of said motor and normally providing maximum energization thereto and including a pair of control terminals, a control amplifier provided with a pair of input terminals and a pair of output terminals connected at its output terminals in a series loop with the control terminals of said first and second power amplifiers, a first variable voltage source providing a selectable output, a second variable voltage source providing an output proportional to the speed of the motor, means connecting said first and second voltage sources in a series opposition loop to the input terminals of said control amplifier for controlling the output thereof in accordance with the applied differential voltage, a shunt resistor across the control terminals of said second amplifier, said shunt resistor being of a low impedance as compared to the impedance of the control terminals of said first and second amplifiers, and a back biased unidirectional current device connected from said first and second amplifiers at a point in the connecting loop circuit to the armature of the motor for completing a current path in said direction responsive to said back bias being overcome, so that variation in the output of said control amplifier from a minimum up through a critical output causes a corresponding variation in the energization of said generator field winding from minimum to maximum energization and causes an increase in the armature voltage sufficient to overcome said back bias, whereby motor speed is controlled between minimum and base speed, and so that variation in the output of said control amplifier from said critical output to a maximum output causes an inverse variation in the energization of said motor field winding from maximum to minimum energization, whereby motor speed is controlled between said base speed and maximum speed.

7. In a motor generator arrangement including a D.C. motor the speed of which is to be controlled in accordance with excitation provided by the armature and the field winding thereof and including a generator for controlling the motor armature voltage in accordance with the excitation provided to the generator armature by the generator field winding, the combination comprising, a first power amplifier including a pair of output terminals connected to the field winding of the generator and normally providing minimum energization thereto and including a pair of control terminals, a second power amplifier including a pair of output terminals connected to the field winding of said motor and normally providing maximum energization thereto and including a pair of control terminals, a control amplifier provided with a pair of input terminals and a pair of output terminals connected at its output terminals in a series loop with the control terminals of said first and second power amplifiers, a first variable voltage source providing a selectable output, a second variable voltage source providing an output proportional to the speed of the motor, a first negative feedback voltage means from the output of said first amplifier, a second negative feedback voltage means from the output of said second amplifier, means connecting said first voltage source in a series opposition loop with said second voltage source and said first and second feedback voltage means to the input terminals of said control amplifier for controlling the output thereof in accordance with the applied differential voltage, a shunt resistor across the control terminals of said second amplifier, said shunt resistor being of a low impedance as compared to the impedance of the control terminals of said first and second amplifiers, a back biased unidirectional current device connected from said first and second amplifiers at a point in the series loop circuit to the motor armature for completing a current path in said direction responsive to said back bias being overcome so that variation in the output of said control amplifier from a minimum up through a critical output causes a corresponding variation in the energization of said generator field winding from minimum to maximum energization and causes an increase in the armature voltage sufficient to overcome said back bias whereby motor speed is controlled between minimum and base speed, and so that variation in the output of said control amplifier from said critical output to a maximum output causes an inverse variation in the energization of said motor field winding from maximum to minimum energization, whereby motor speed is controlled between said base speed and maximum speed.

8. In a motor generator arrangement including a D.C. motor the speed of which is to be controlled in accordance with excitation provided by the armature and the field winding thereof and including a generator for controlling the motor armature voltage in accordance with the excitation provided to the generator armature by the generator field winding, the combination comprising, a first power amplifier including a pair of output terminals connected to the field winding of the generator and normally providing minimum energization thereto and including a pair of control terminals, a second power amplifier including a pair of output terminals connected to the field winding of said motor and normally providing maximum energization thereto and including a pair of control terminals, a control amplifier provided with a pair of input terminals and a pair of output terminals connected at its output terminals in a series loop with the control terminals of said first and second power amplifiers, a first variable voltage source, a second variable voltage source providing an output proportional to the speed of the motor, a first negative feedback voltage means from the output of said first amplifier, a second negative feedback voltage means from the output of said second amplifier, said first and second voltage feedback means providing an output corresponding to the rate of change of current flow through the associated field winding, means connecting said first voltage source in a series opposition loop with said second voltage source and said first and second feedback voltage means to the input terminals of said control amplifier for controlling the output thereof in accordance with the applied differential voltage, a shunt resistor across the control terminals of said second amplifier, said shunt resistor being of a low impedance as compared to the impedance of the control terminals of said first and second amplifiers, a back biased unidirectional current device connected from said first and second amplifiers at a point in the series loop circuit to the armatures of the generator and motor for completing a current path in said direction responsive to said back bias being overcome so that variation in the output of said control amplifier from a minimum up through a critical output causes a corresponding variation in the energization of said generator field winding from minimum to maximum energization and causes an increase in the armature voltage sufficient to overcome said back bias, whereby motor speed is controlled between minimum and base speed, and so that variation in the output of said control amplifier from said critical output to a maximum output causes an inverse variation in the energization of said motor field winding from maximum to minimum energization, whereby motor speed is controlled between said base speed and maximum speed.

9. In a motor generator arrangement including a D.C. motor the speed of which is to be controlled in accordance with excitation provided by the armature and the field winding thereof and including a generator for controlling the motor armature voltage in accordance with the excitation provided to the generator armature by the generator field winding, the combination comprising, a first power amplifier including a pair of output terminals connected to the field winding of the generator and normally providing minimum energization thereto and including a pair of control terminals, a second power amplifier including a pair of output terminals connected to the field winding of said motor and normally providing maximum energization thereto and including a pair of control terminals, a control amplifier provided with a pair of input terminals and a pair of output terminals connected at its output terminals in a series loop with the control terminals of said first and second power amplifiers, a first variable voltage source, a second variable voltage source providing an output proportional to the speed of the motor, a first negative feedback voltage means from the output of said first amplifier, a second negative feedback voltage means from the output of said second amplifier, said first and second voltage feedback means providing an output corresponding to the rate of change of current flow through the associated field winding, means connecting said first voltage source in a series opposition loop with said second voltage source and said first and second feedback voltage means to the input terminals of said control amplifier for controlling the output thereof in accordance with the applied differential voltage, a shunt resistor across the control terminals of said second amplifier, said shunt resistor being of a low impedance as compared to the impedance of the control terminals of said first and second amplifiers, a unidirectional current device connected for supporting a current flow from said first and second amplifiers at a point in the series loop circuit to the motor armature, and biasing means connected in series with said current device for rendering said device normally non-conductive, so that variation in the output of said control amplifier from a minimum up through a critical output causes a corresponding variation in the energization of said generator field winding from minimum to maximum energization and causes an increase in the armature voltage sufficient to overcome the output of said biasing means, whereby motor speed is controlled between minimum and base speed, and so that variation in the output of said control amplifier from said critical output to a maximum output causes an inverse variation in the energization of said motor field winding from maximum to minimum energization, whereby motor speed is controlled between said base speed and maximum speed.

10. In a motor generator arrangement including a D.C. motor the speed of which is to be controlled in accordance with excitation provided by the armature and the field winding thereof, and including a generator for controlling the motor armature voltage in accordance with the excitation provided to the generator armature by the generator field winding; the combination comprising, a first amplifier normally providing excitation to the field winding of the generator, a second amplifier normally providing excitation to the field winding of the motor, and control means connected to the input terminals of said first and second amplifiers normally operative alternatively in a first condition and in a second condition, said control means in said first condition variably regulating the output of said first amplifier and in a second condition variably regulating the output of said second amplifier, said control means including a back biased unidirectional current device responsive to a predetermined motor armature voltage for operating said control means to said second condition.

11. In a motor generator arrangement including a D.C. motor the speed of which is to be controlled in accordance with excitation provided by the armature and the field winding thereof, and including a generator for controlling the motor armature voltage in accordance with the excitation provided to the generator armature by the generator field winding; the combination comprising, a first amplifier normally providing excitation to the field winding of the generator, a second amplifier normally providing excitation to the field winding of the motor, and control means connected to the input terminals of said first and second amplifiers and operative alternatively in a first condition and in a second condition, said control means in said first condition variably regulating the output of only said first amplifier and in a second condition variably regulating the output of only said second amplifier, said control means including therein a back biased unidirectional current device responsive to a voltage different from a predetermined motor armature voltage for operating said control means in said first condition and responsive to said predetermined motor armature voltage for operating said control means to said second condition.

12. In a motor generator arrangement including a D.C. motor the speed of which is to be controlled in accordance with excitation provided by the armature and the field winding thereof, and including a generator for controlling the motor armature voltage in accordance with the excitation provided to the generator armature by the generator field winding; the combination comprising, a first amplifier normally providing excitation to the field winding of the generator, a second amplifier normally providing excitation to the field winding of the motor, and control means connected to the input terminals of said first and second amplifiers and operative in a first condition and in a second condition, said control means in said first condition variably regulating the output of said first amplifier and fixedly regulating the output of said second amplifier and in a second condition fixedly regulating the output of said first amplifier and variably regulating the output of said second amplifier, said control means including therein a back biased unidirectional current device responsive to voltages below a predetermined maximum motor armature voltage for operating said control means in a first condition and responsive to said predetermined maximum motor armature voltage for operating asid control means in said second condition.

References Cited in the file of this patent
UNITED STATES PATENTS

| | | |
|---|---|---|
| 2,469,899 | Sills | May 10, 1949 |
| 2,783,424 | Fath et al. | Feb. 26, 1957 |
| 2,789,262 | Forrestal et al. | Apr. 16, 1957 |